UNITED STATES PATENT OFFICE.

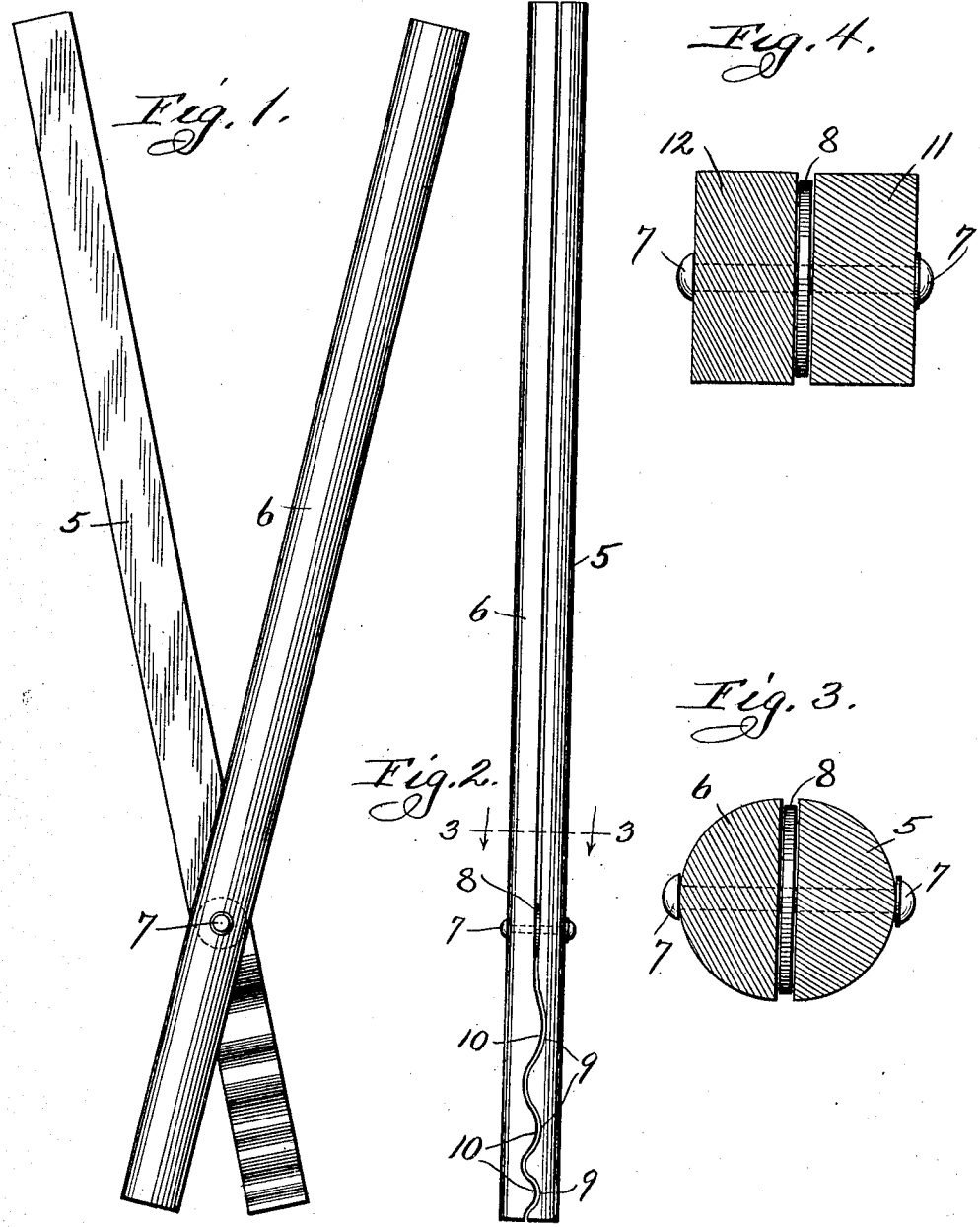

DAVID F. PORTER, OF CHICAGO, ILLINOIS.

CLOTHES-TONGS.

No. 892,008.        Specification of Letters Patent.        Patented June 30, 1908.

Application filed January 30, 1905. Serial No. 243,430.

*To all whom it may concern:*

Be it known that I, DAVID F. PORTER, a citizen of the United States, residing at Chicago, in the county of Cook and State of Illinois, have invented a new and useful Clothes-Tongs, of which the following is a specification.

My invention relates to clothes tongs for lifting clothes out of hot water and the objects of my improvements are, first, to provide a tongs which will prevent the clothes from slipping off of the same; second, to facilitate the ready and easy handling of the clothes; third, to make the construction cheap and so that there will be no waste of material; fourth, to make a strong and durable device and other objects to become apparent from the description to follow.

Heretofore clothes sticks and tongs that were constructed to absolutely prevent the clothes from slipping off of the same were of such complicated construction that the cost of their manufacture prevented their extensive use, but my invention will absolutely prevent the slipping of the clothes and can be made very cheaply without practically wasting any material, and of a simple and durable construction. Other objectionable features are also overcome by my invention, which is made from a single round or square stick. The stick is sawed into two halves longitudinally, the saw cut near the business end of the stick or tongs being made in a zig-zag or corrugated form. These two halves are then secured together pivotally by a rivet or otherwise.

This invention pertains to certain novel features to be described in the specification and particularly pointed out in the appended claim.

To better describe my invention I have illustrated the same on the accompanying sheet of drawing forming a part of this specification and in which:—

Figure 1, is a side elevation; Fig. 2, is an edge view; Fig. 3, is a cross section on line 3—3 of Fig. 2; and Fig. 4, is a similar view of a modified form.

Similar reference characters refer to similar parts throughout the several views.

The tongs comprises the two members 5 and 6 which are pivotally secured together by the rivet or bolt 7 which passes through perforations provided in the members 5 and 6 and located nearer to one end than the other of the same. I prefer to provide a washer 8 between the members 5 and 6 held in place by the rivet 7 to retain said members slightly separated. The members 5 and 6 are made by cutting a single piece of wood preferably round in cross section and of the desired length, longitudinally through the center. To afford a better gripping end on the bite or business end of the tongs I prefer to make this longitudinal cut through the stick in a wave or zig-zag form as shown in Fig. 2. This form of cut provides the concave portions 9 on the member 5 into which fit the convex portions 10 on the member 6.

Fig. 4 shows a modification in which the members 11 and 12 corresponding to the members 5 and 6, are formed out of a piece of wood which is square in cross-section.

Having thus fully described my invention what I claim as new and desire to secure by Letters Patent of the United States is:—

In clothes tongs two members pivoted together to swing about a common axis, the greater longitudinal portion of each of said members provided with a flat surface held in juxtaposition opposed to the flat surface of the other member, the flat surface of each member lying in a plane at right angles to said axis throughout so as to permit the bite end of one member to swing past the bite end of the other member in either direction and the opposing surfaces of said bite ends provided with intermeshing corrugations.

In testimony whereof I have signed my name to this specification in presence of two subscribing witnesses this 27th day of January 1905 at Chicago, Illinois.

DAVID F. PORTER.

Witnesses:
MARY D. PORTER,
R. J. JACKER.